United States Patent
Solheid et al.

(10) Patent No.: US 6,532,332 B2
(45) Date of Patent: Mar. 11, 2003

(54) CABLE GUIDE FOR FIBER TERMINATION BLOCK

(75) Inventors: James J. Solheid, Lakeville, MN (US); Patrick J. Thompson, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 44 days.

(21) Appl. No.: 09/784,815

(22) Filed: Feb. 15, 2001

(65) Prior Publication Data

US 2002/0118943 A1 Aug. 29, 2002

(51) Int. Cl.[7] ................................................. G02B 6/00
(52) U.S. Cl. ...................................... 385/134; 385/135
(58) Field of Search .................................. 385/134–139

(56) References Cited

U.S. PATENT DOCUMENTS

| | | |
|---|---|---|
| 5,497,444 A | 3/1996 | Wheeler |
| 5,717,810 A | 2/1998 | Wheeler |
| 5,758,003 A | 5/1998 | Wheeler et al. |

OTHER PUBLICATIONS

ADC Telecommunications Next Generation Frame Product Family Ordering Guide, dated Oct. 1998.
ADC Telecommunications Next Generation Frame Product Family, dated Dec. 2000.

Primary Examiner—Khiem Nguyen
(74) Attorney, Agent, or Firm—Merchant & Gould PC

(57) ABSTRACT

The present invention relates to the management of cross-connect cables extending from fiber termination blocks with sliding fiber adaptor modules within a fiber distribution frame. A cable management divider is mounted onto a set of arcuate cable guides to direct the cables extending across the cable guides into cable channels. The purpose for providing these channels is to reduce the interference to movement and access of cables from fiber optic adaptor modules in different areas of the fiber termination block. Depending on the density and configuration of the fiber adaptors and sliding modules within the fiber termination block, multiple sets of arcuate cable guides may be provided and multiple cable management dividers may be mounted to the arcuate cable guides. The fiber distribution frame also incorporates a cable trough system to direct cables after the cables extend through the arcuate cable guides and through the channels defined by the cable management dividers. The cable trough interior surface resists the sliding movement of cables laid in the trough is also provided. This resistance to sliding of cables is desirable since some degree of slack in the cables within the fiber termination block is necessary for proper sliding of the adaptor modules. If the cables are permitted to slide within the trough leading away from the fiber termination blocks, this necessary cable slack might be removed from the blocks.

37 Claims, 11 Drawing Sheets

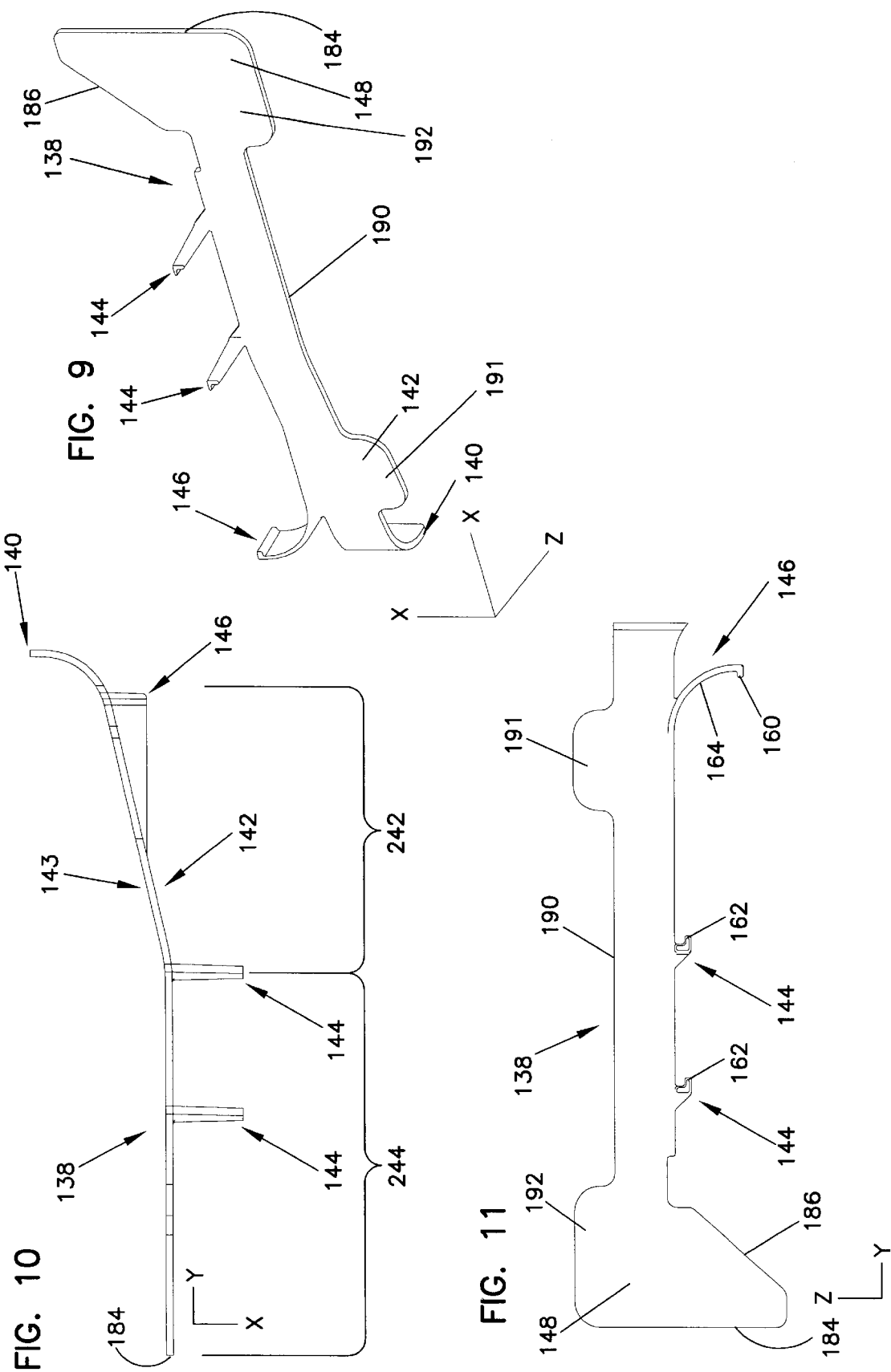

CABLE GUIDE FOR FIBER TERMINATION BLOCK

FIELD OF THE INVENTION

The present invention relates to cable management for optical fiber termination systems. Specifically, the invention relates to cable guides and troughs for managing the fiber optic cables extending to the terminations in frames, modules, blocks, and other fixtures.

BACKGROUND OF THE INVENTION

In telecommunications industry, the demand for added capacity is growing rapidly. This demand is being met in part by the increasing use and density of fiber optic transmission equipment. Even though fiber optic equipment permits higher level of transmission is the same or smaller footprint than traditional copper transmission equipment, the demand requires even higher levels of fiber density. This has led to the development of high-density fiber handling equipment.

Examples of this type of equipment are found in U.S. Pat. Nos. 5,497,444, 5,717,810 and 5,758,003. These patents disclose systems of high-density fiber distribution frames and high-density fiber termination blocks (FTBs) which are mounted to the frames. Because of the large number of optical fibers passing into and out of the FTBs, the frame and blocks have a variety of structures to organize and manage the fibers. While some structures are used to aid the fibers entering the back of the frame and FTBs, an area of concern for this invention has to do with the cross-connect cables attached to the front of the FTBs. These cross-connect cables tend to be used in a much more dynamic fashion, whereas the rear cables tend to be much more static once initial installation is complete.

In an example fiber optic termination and cross-connection usage, there is often a pairing of FTBs, one connected to the outside plant fiber cable, and the other connected to the array of fibers linked to telecommunications devices throughout a facility. These FTBs would typically be mounted adjacent to one another in a fiber distribution frame, or mounted in neighboring distribution frames, in a facility switching area. Cross-connect cables are used to optically link the termination of an outside plant fiber in the outside plant FTB to the termination of a facility device fiber in the facility FTB. The cross-connect cable would be lead from the termination at one FTB through a series of cable guides, troughs and/or rings in the frame holding that FTB, through known structures for securing the slack in the cross connect cables, into the cable guides, troughs and/or rings in the frame holding the second FTB and end at the termination in the second FTB.

As new termination blocks and frames have been developed allowing ever higher levels of density of fiber, a need for better cross-connect cable management has been recognized. Concerns have arisen with respect to cables from terminations higher in the FTB hanging on top of and interfering with the movement of cables from terminations lower in the FTB. Also, cross-connect cables from FTBs mounted higher in the frame have longer lengths of cross-connect cables hanging in the vertical cable channels leading the cable out of the frame. The weight of these vertical lengths can exacerbate the interference problems caused by overhanging cables. These concerns can become magnified when coupled with the sliding modules incorporated into a high-density fiber distribution frame such as shown in the above-referenced patents.

The sliding of the modules to permit better access to the high density of fiber terminations inside a FTB requires that the cables attached to the terminations have some combination of slack and movement. When a cross-connect cable is attached to an FTB in a frame and the cable is led out of the FTB, through the cable guides, troughs and/or rings and into the vertical cable channel, much of the slack is pulled out of the cable by the weight of the cable hanging vertically in the channel. Therefore, some movement of the cables is necessary. But the cables attached to lower mounted modules in the FTB tend to be overlaid by the cables attached to higher mounted modules in the same FTB. The movement of the lower cables necessary to allow the modules to slide is hindered by the interference of the higher cables, making sliding of the modules difficult.

Further development in fiber termination systems is desired.

SUMMARY OF THE INVENTION

An aspect of this invention relates to a cable management divider for managing cross-connect cables attached to optical fiber termination blocks with sliding cable adaptor modules, where a plurality of fiber termination blocks are mounted to a fiber distribution frame. Cable guides are mounted in corresponding relationship with the sliding adaptor modules. The cable management divider is positioned relative to one or more cable guides on the fiber termination block to define cable channels for cables to be grouped. The cable divider can have a curved upper end and clips allowing the divider to be attached to the cable guides. More than one divider may be mounted on a block.

A further aspect of this invention relates to a fiber distribution frame with a plurality of fiber termination blocks with sliding cable adaptor modules mounted on the frame where cable management dividers are mounted to the blocks to manage cross-connect cables extending from the blocks. The modules may be configured in two sets which slide in opposite directions, with each set of modules having a set of cable guides mounted in corresponding relation to it. Each of these sets of cable guides has a cable management divider positioned on the cable guides. Two or more cable management dividers may be positioned on each set of cable guides.

A further aspect of this invention is a cable management divider sized and shaped to be mounted on a set of arcuate cable guides so that the cable management divider defines channels for organizing and managing the cables passing through the arcuate cable guides.

A further aspect of this invention relates to providing resistance to cable sliding movement within cable troughs in a fiber distribution frame through the addition of a non-skid coating or other material.

A variety of advantages of the invention will be set forth in part in the detailed description that follows and in part will be apparent from the description, or may be learned by practicing the invention. It is understood that both the foregoing general description and the following detailed description are explanatory only and are not restrictive of the invention as claimed.

BRIEF DESCRIPTION OF THE DRAWINGS

The accompanying drawings, which are incorporated in and constitute a part of the specification, illustrate several aspects of the invention and together with the description, serve to explain the principles of the invention. A brief description of the drawings is as follows:

FIG. 9 is a perspective view of the long fiber management guide shown in FIG. 6.

FIG. 10 is a front view of fiber management guide of FIG. 9.

FIG. 11 is a side view of fiber management guide of FIG. 9.

DETAILED DESCRIPTION

Reference will now be made in detail to exemplary aspects of the present invention that are illustrated in the accompanying drawings. Wherever possible, the same reference numbers will be used throughout the drawings to refer to the same or like parts.

Figure 1:
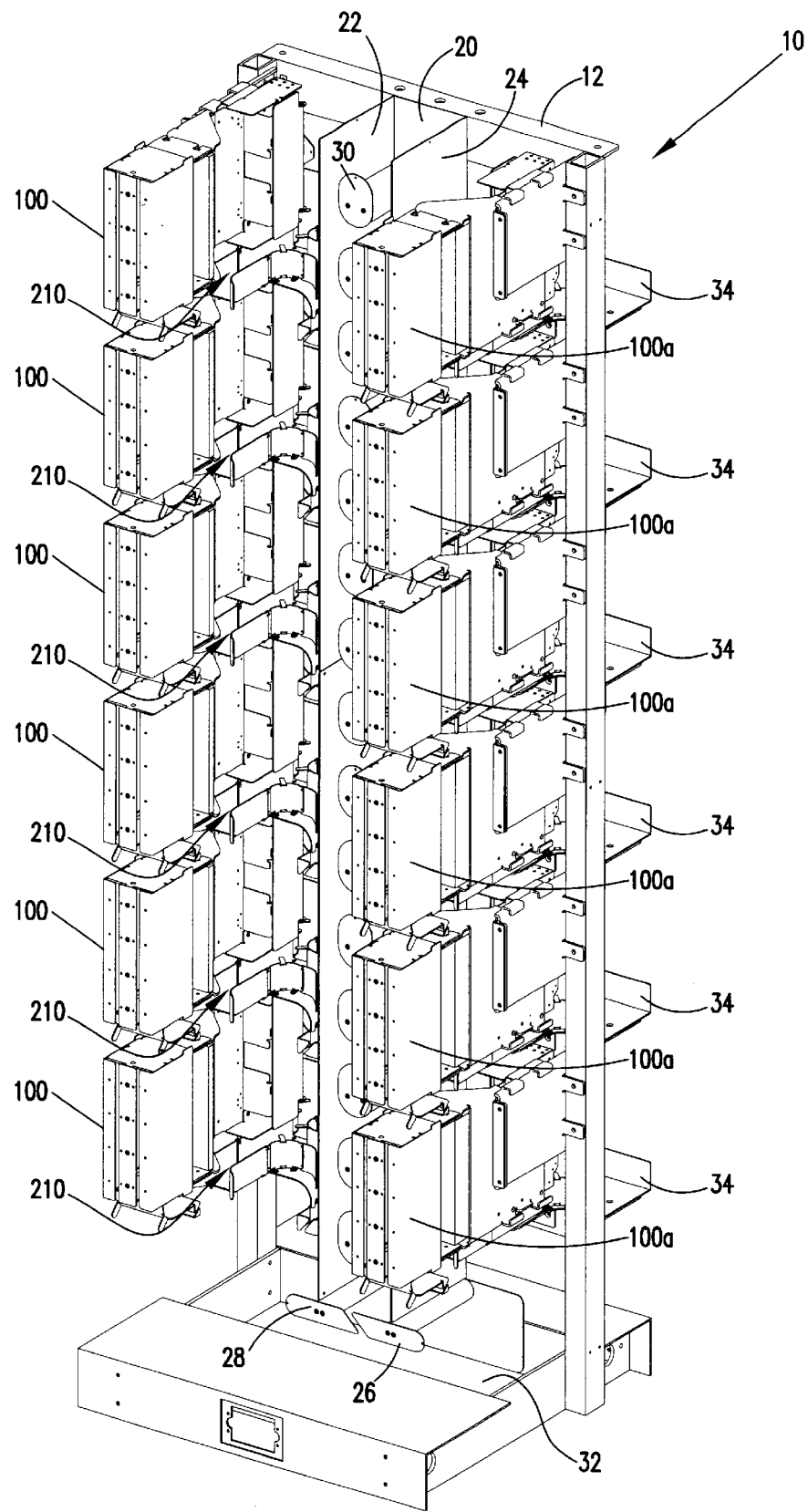
FIG. 1 is a front perspective view of a high-density fiber distribution frame with fiber termination blocks in accordance with the concepts of the present invention.
Figure 3:
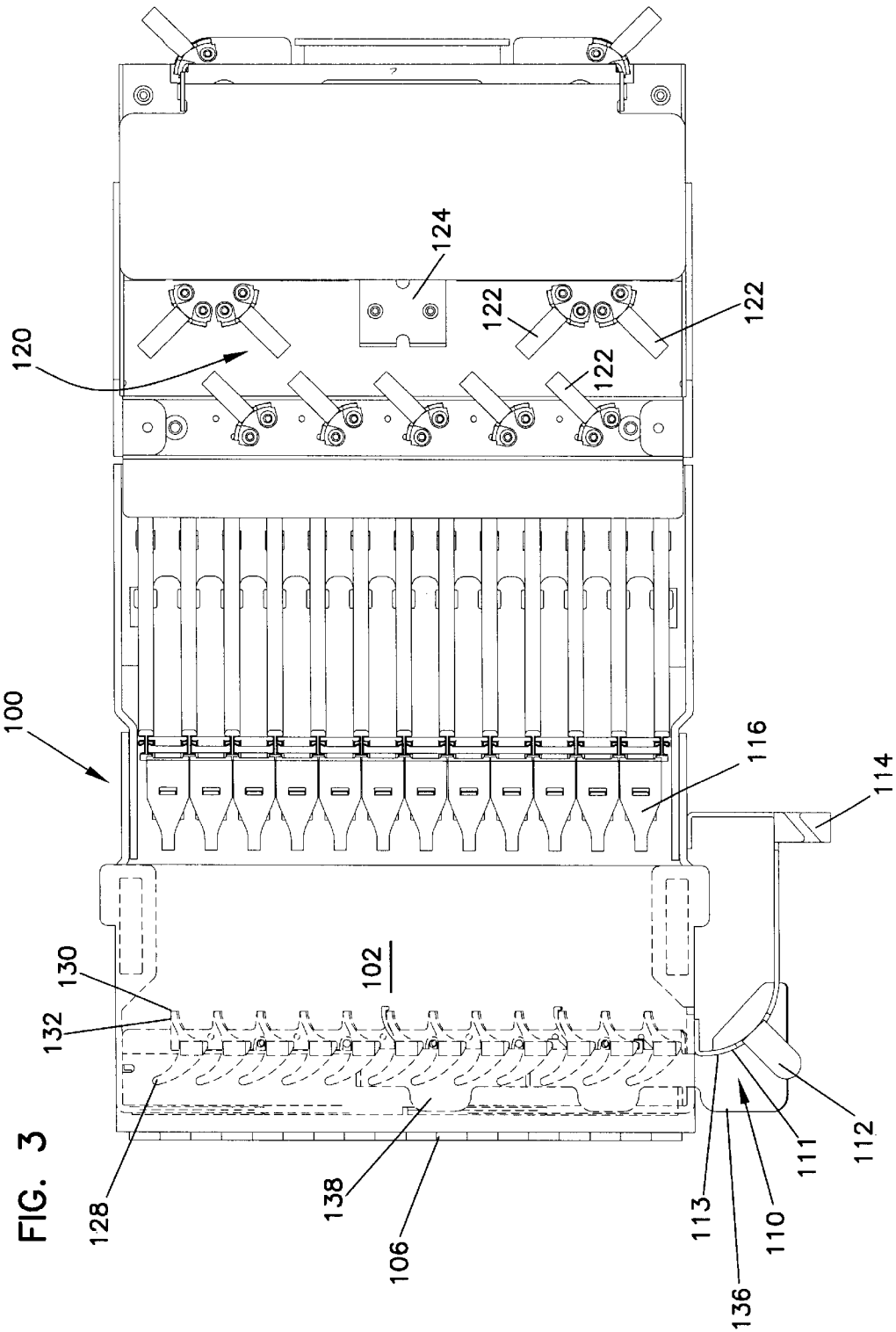
FIG. 3 is a side view of the fiber termination block of FIG. 2 with the front fanning guides and other interior structure shown as dashed lines.
Figure 5:
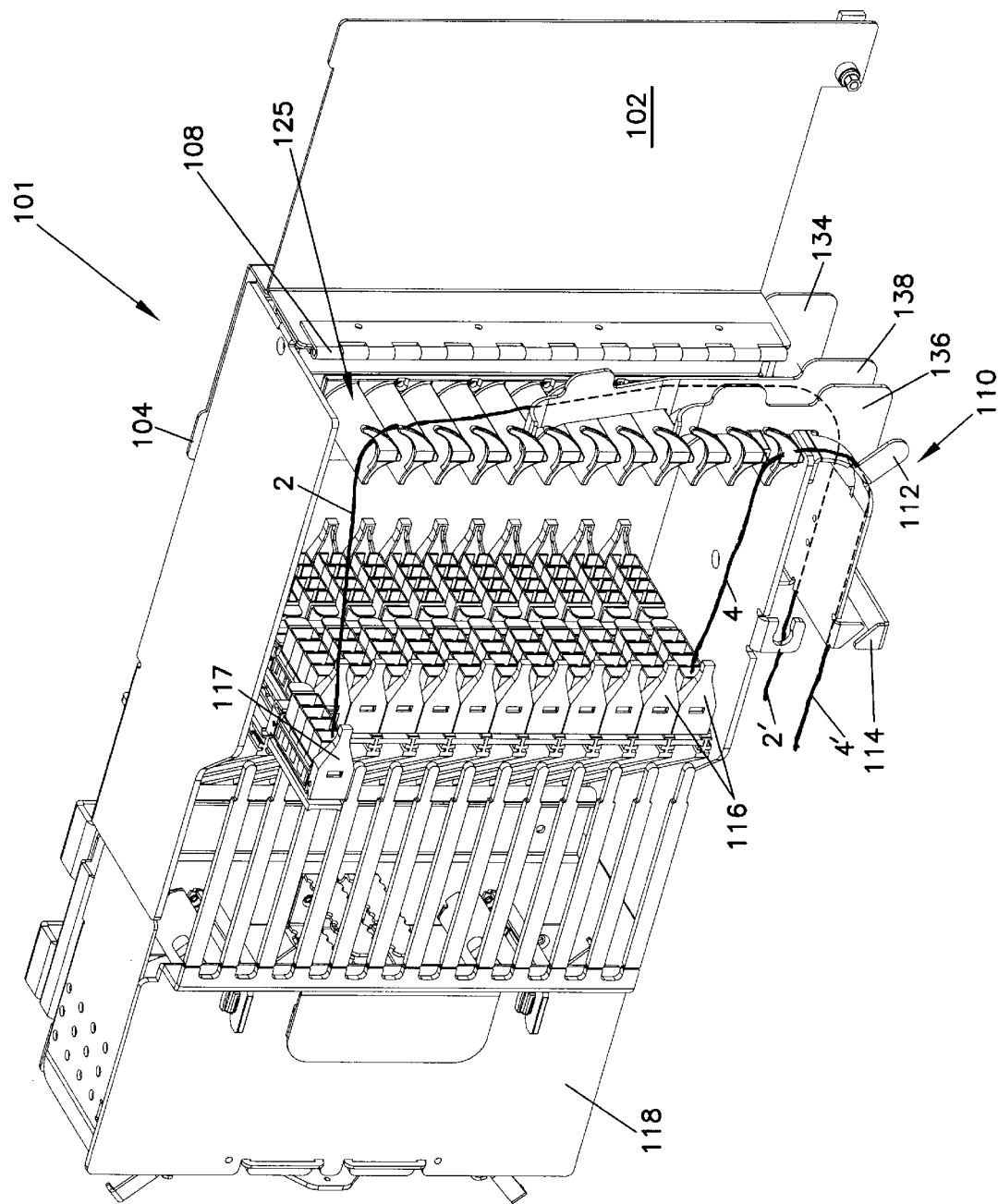
FIG. 5 is a front perspective view of a fiber termination block shown in FIG. 4 with one of the cross-connect cable covers open and one of the adapter modules shown extended, and with dashed lines showing representative cable routing from the upper and lower adapter modules.

Referring now to FIG. 1, a fiber distribution frame 10 is shown. A similar fiber distribution frame is the subject of U.S. Pat. No. 5,758,003, the disclosure of which is hereby incorporated by reference. Attached to fiber distribution frame 10 are twelve fiber termination blocks or fixtures, mounted in two vertical rows of six blocks 100 on the left side of frame 10 and six blocks 100a on the right side of frame 10. Located intermediately between these two rows of fiber termination blocks is a jumper storage trough 20 defined by sidewalls 22 and 24 and fiber distribution frame back 12. Within jumper storage trough 20 are a series of spools 30 for organizing and storing excess slack in cross-connect cables used to link between optical fiber terminations inside fiber termination blocks 100. These cross-connect cables are well known in the art and are not shown in most of the FIGS. in the interest of clarity. However, representative cables are shown in FIGS. 3 and 5. Below each fiber termination block 100 or 100a is a trough 210 for leading cross connect cables extending from a block 100 or 100a. Troughs 210 will be discussed in more detail below. At the lower end of trough 20 are radius limiters 26 and end caps 28 for assisting in the routing and management of the cross-connect cables and ensuring that minimum bend radius rules are not violated. Lower horizontal cable trough 32 allows cross-connect cables to pass from one row of fiber termination blocks 100, into jumper trough 20 if necessary and to the other row of fiber termination blocks, or from frame 10 to an adjacently mounted but not shown fiber distribution frame of similar nature and construction. Rear cable troughs 34 are shown on the back of frame 10 for managing and directing cables entering and exiting the rear of blocks 100 and 100a.

Note that fiber termination blocks 100 and 100a are essentially the same device, but mirror images of one another for mounting on the left and right side of a fiber distribution frame, respectively. Items specifically called out and identified for either block 100 or 100a should be understood to also apply to the other block unless otherwise specifically mentioned.

Figure 2:
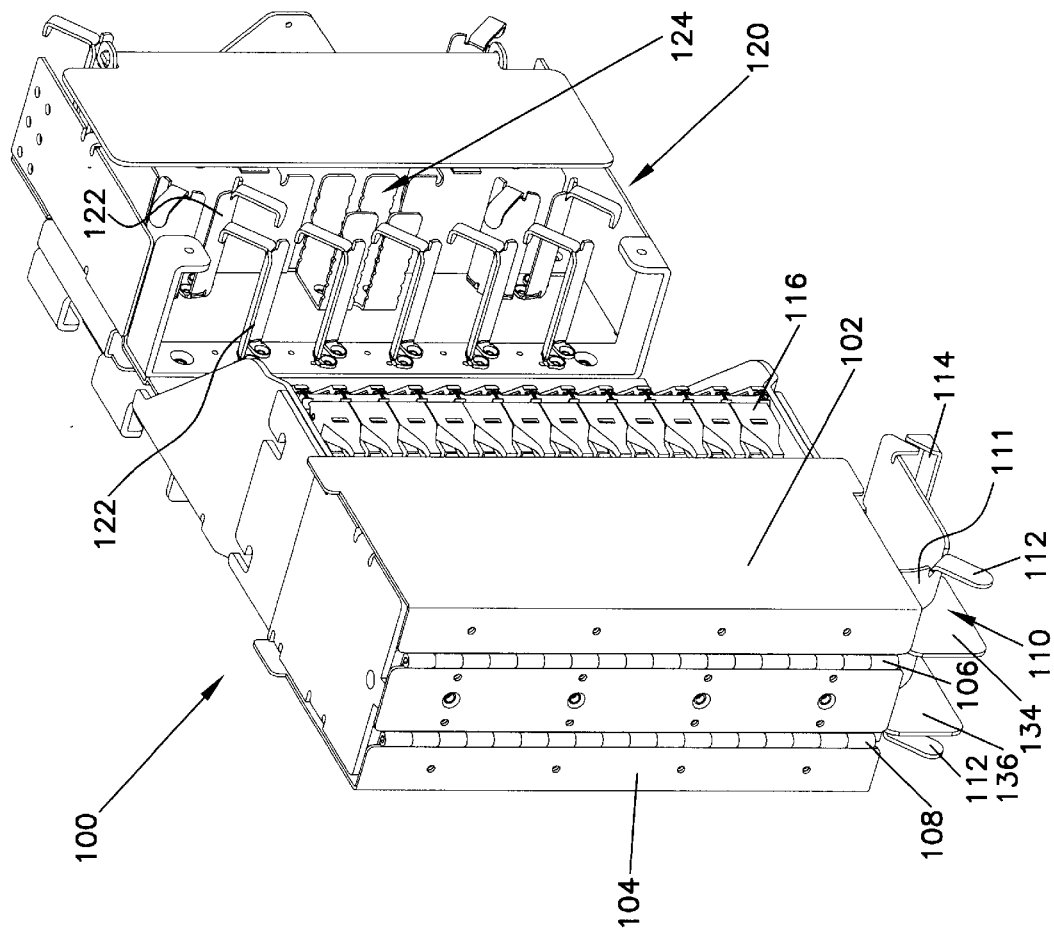
FIG. 2 is a front perspective view of a fiber termination block from FIG. 1 with the cross-connect cable cover in place.

Referring now to FIGS. 2 and 3, a fiber termination block 100 for mounting on the left hand side of a fiber distribution frame 10 is shown with rear cable management area 120 partially uncovered. Cross-connect cable covers 102 and 104 are mounted with hinges 106 and 108, respectively, at the front of block 100. Cable guide 110 extends down and toward the rear from the front of block 100 and includes radius limiter surface 111, side guides 112, slots 113 and rear guide 114. Radius limiter surface 111 ensures that cables transitioning from vertical to horizontal through cable guide 110 are not bent in a tighter radius than bend radius rules require. Slots 113 receive lower extension tabs 186 and 188 of cable management dividers 138 and 136, described in more detail below. Individual sliding adaptor modules 116 are mounted within block 100 and slide horizontally as shown. This horizontal sliding arrangement of adaptor modules 116 can be seen in the '003 patent. Alternatively, as shown in U.S. Pat. Nos. 5,497,444 and 5,717,810, the disclosures of which are hereby incorporated by reference, the block and modules can be configured to slide vertically. The rear cable management area 120 is shown without cables for clarity. Rear area 120 includes a series of cable managers with rear guides 122 having cable retention and bend radius protection features and a cable fanning strip holder 124. In case the cable entering the rear of block 100 is in the form of ribbon cable composed of 12 fibers, these ribbons will need to be fanned so that the individual fibers in the ribbon are broken into separate strands that can be connected to an adapter and terminated at the back of a module 116. Fanning strip holder 124 is sized and shaped to hold such fanning strips.

Figure 4:
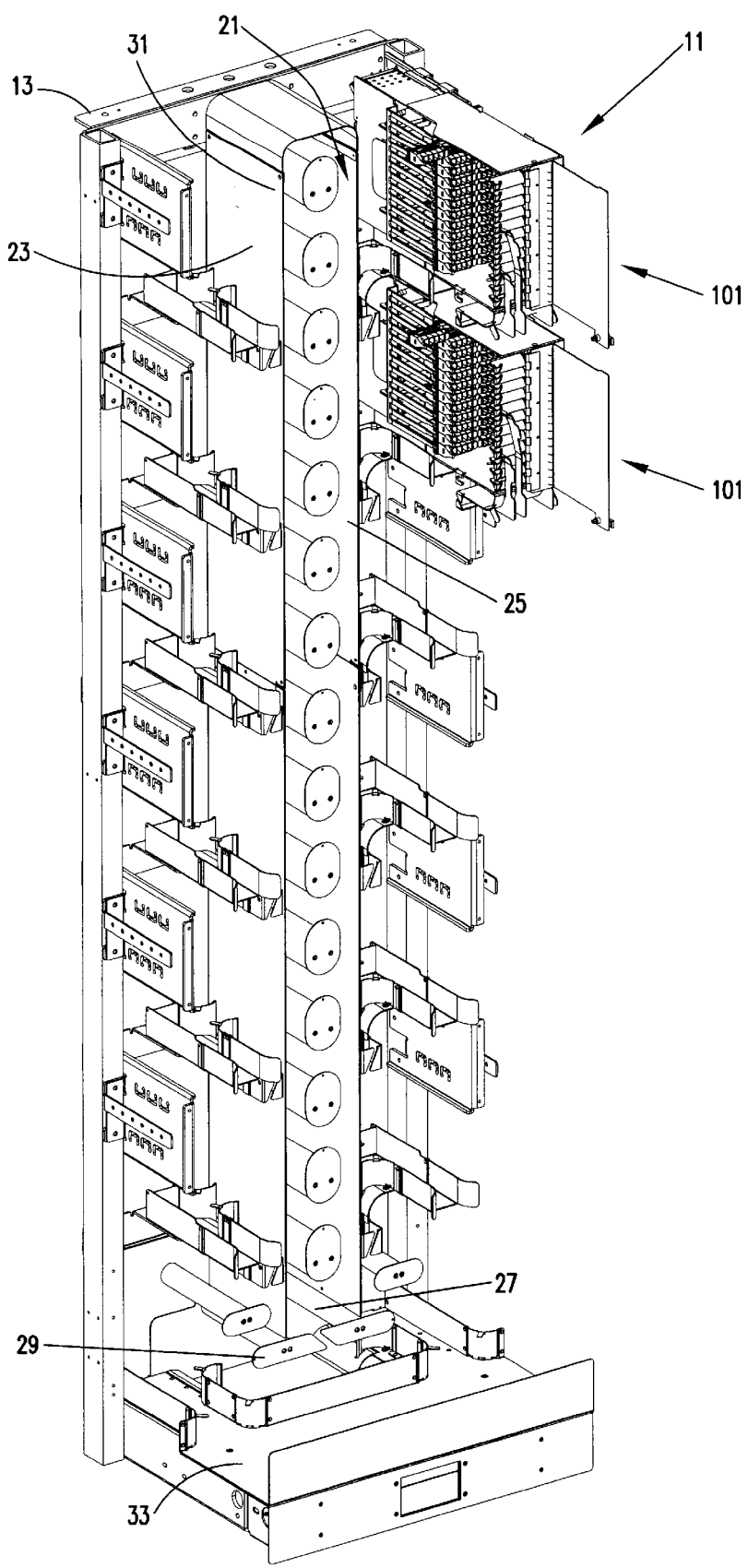
FIG. 4 is a front perspective view of an alternative embodiment of a high-density fiber distribution frame with two fiber termination blocks in accordance with the concepts of the present invention.

Referring now to FIG. 4, a second embodiment of a fiber distribution frame 11 is shown with two alternative embodiment fiber termination blocks 101 in place. Frame 11 is adapted for use where access is desired only from the front of the frame. No rear cable troughs are present and front trough 33 is deeper and wider. Frame 11 includes provisions for mounting a plurality of fiber termination blocks in two vertical rows in the same fashion as described above with regard to frame 10. These mounts are shown in more detail in FIG. 15, below. Located in the center of frame 11 is a jumper storage trough 21 defined by sidewalls 23 and 25 and fiber distribution frame back 13. Within jumper storage trough 21 are a series of spools 31 for organizing and storing excess slack in cross-connect cables used to link between optical fiber terminations inside fiber termination blocks 101. These cross-connect cables are well known in the art and are not shown in FIG. 4 in the interest of clarity. At the lower end of trough 21 are radius limiters 27 and end caps 29 for assisting in the routing and management of the cross-connect cables and ensuring that minimum bend radius rules are not violated. Lower horizontal cable trough 33 allows cross-connect cables to pass from one row of fiber termination blocks 101, into jumper storage trough 21 if necessary and to the other row of fiber termination blocks, or from frame 11 to an adjacently mounted but not shown fiber distribution frame of similar nature and construction.

Figure 6:
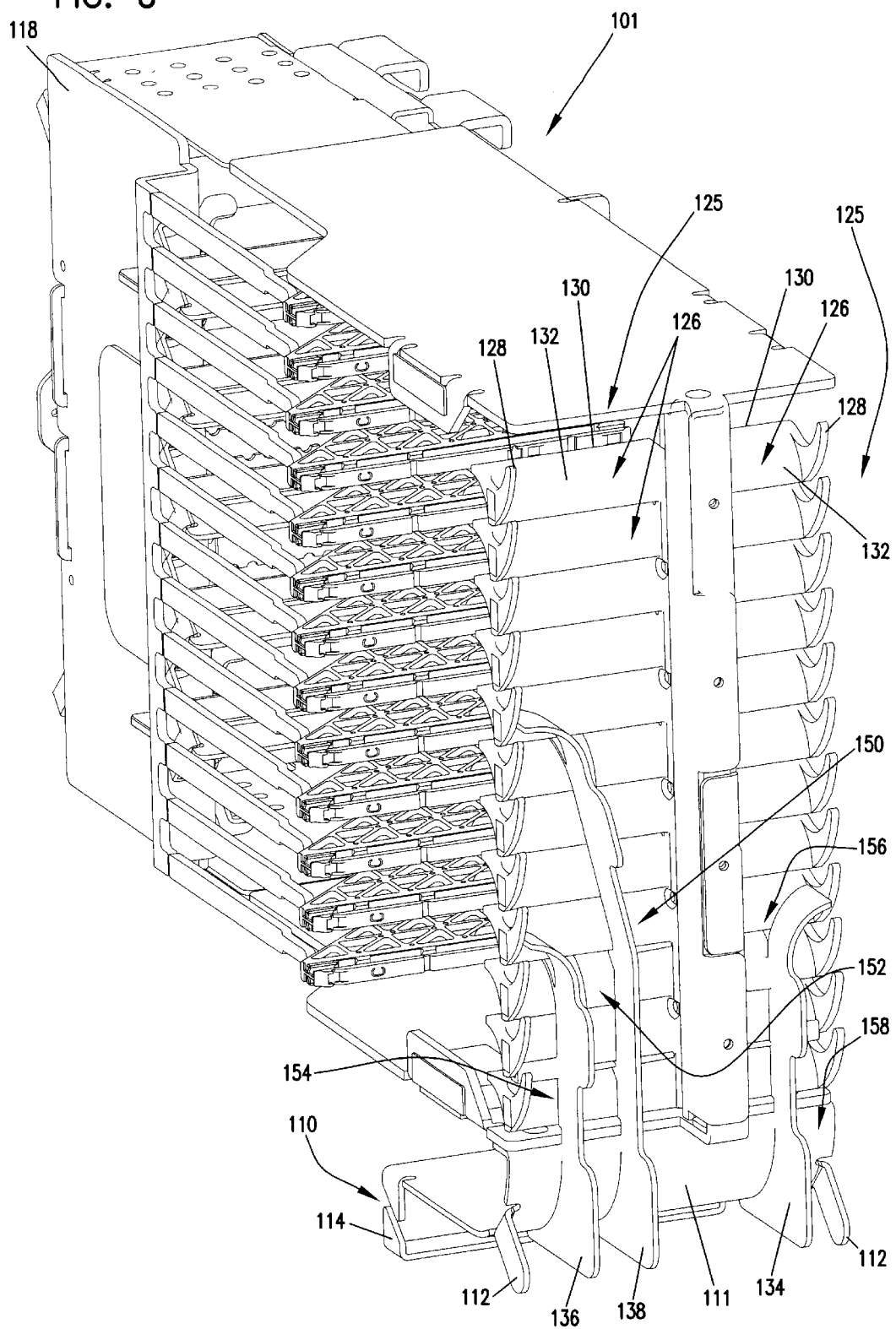
FIG. 6 is a perspective view of the fiber termination block of FIG. 5 with adapter modules and cross-connect cable covers removed.
Figure 7:
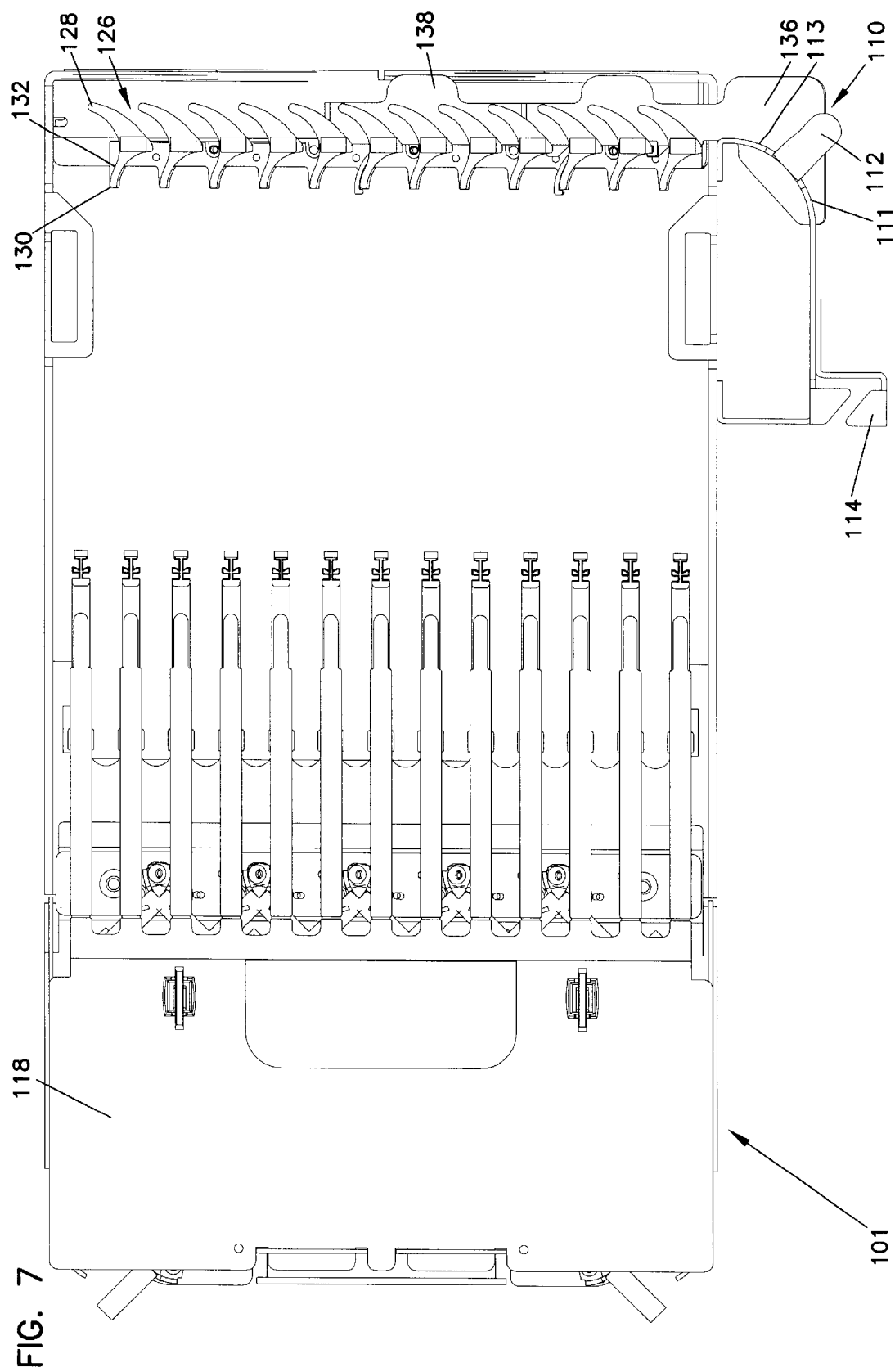
FIG. 7 is a side view of the fiber termination block of FIG. 6.
Figure 8:
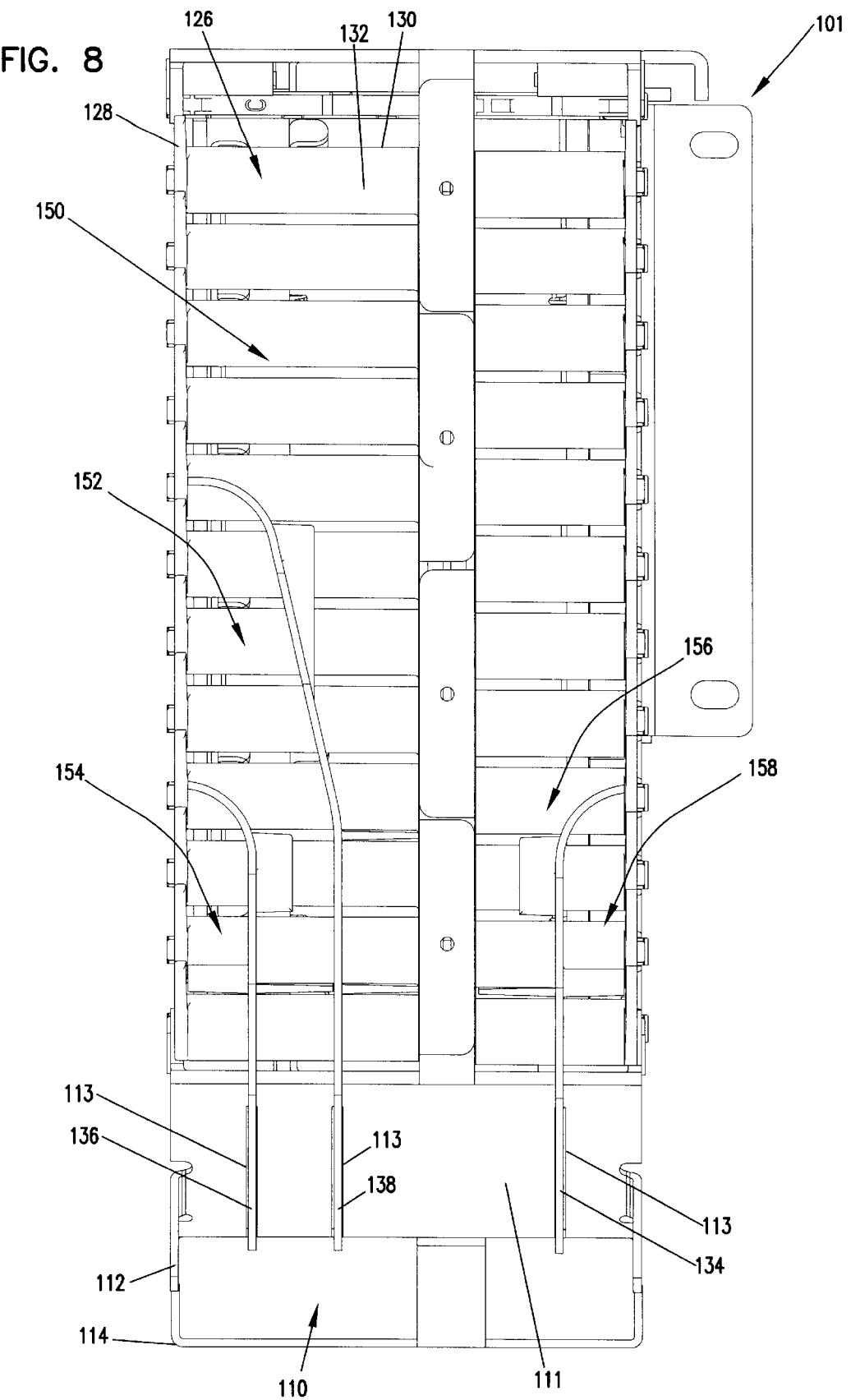
FIG. 8 is a front view of the fiber termination block of FIG. 6.

Referring now to FIGS. 5 through 8, fiber termination block 101 is shown with the rear cover 118 in place over the rear cable management area 120. Fiber termination block 101 differs from fiber termination block 100a slightly but both perform the same function. The two blocks 101 and 100a have different housings designs and are designed to have different numbers of adapters mounted on each module 116. In FIG. 5, modules 116 are shown with one module 117 shown extended to the limit of its movement along its line of travel. In FIGS. 6 through 8, modules 116 have been removed from for clarity, as have the cross-connect cable covers 102 and 104. Seen on the front of block 101 are front fanning devices 125. Each device 125 is composed of fanning guides 126 including side shields 128, upper edges 130 and rounded surfaces 132. Each of these front fanning devices 125 is mounted to block 101 so that each upper edge 130 of each fanning guide 126 is approximately level with and parallel to a module 116. Cross-connect cables are connected to adaptors mounted on module 116, passed over side shield 128 so that the cable drapes across upper edge 130 and down surface 132. The cable is then directed between side guides 112 and through rear cable guide 114. At this point, the cross-connect cable is passed into the cable trough which is integral to the fiber distribution frame 10 and which will be discussed in more detail below.

Mounted to front fanning guides 126, on the side opposite from modules 116 are cable management dividers 134, 136 and 138. These dividers organize the cross-connect cables extending from modules 116 across front fanning guides 126 into distinct vertical paths. As shown in the FIGS., the upper surface of divider 138 defines an essentially vertical channel 150 for cables from the upper group of modules 116. The lower surface of divider 138 and the upper surface of divider 136 define an essentially vertical channel 152 for cross-connect cables from the middle group modules 116. And the lower surface of divider 136 defines an essentially vertical channel 154 for cross-connect cables from the lower group of modules 116. Divider 134 defines two essentially vertical channels on the on the right side of block 101, channel 156 for cables from the higher mounted modules and channel 158 for cables from the lower mounted modules. Dividers 134 and 136 are the same basic size and shape except that they are mirror images of each other. As shown, both dividers 134 and 136 are mounted to the front fanning guides 126 which are located in front of the fourth modules from the bottom of block 101, so that cables from the lower three modules pass into the channels 158 and 154, respectively. Divider 138 is mounted to the front fanning guide 126 in front of the eighth module from the bottom, so that cables from the upper five modules are directed into channel 150. The cables from the fourth to the seventh modules from the bottom are directed into channel 152. A divider 140, not shown, is a mirror image version of divider 138 and would be used where cable densities are high enough on the right side of a block 100 or 101 to require a pair of dividers be used. As shown in FIGS. 5 through 8, block 101 has a higher number of adapters and therefore cross-connect cables on the left side than on the right side. For these illustrated fiber termination blocks, the side with the higher density of cables will have a greater need to keep cables from the upper modules from interfering with the cables from the lower modules. Thus, two dividers are provided. The side with the lower density of cables will not have as great a problem with cable interference and thus only a single divider is shown. The number of dividers provided for a particular fiber termination block will depend on the density of cables extending from modules 116 through front fanning device 125 and into cable guide 110.

As illustrated in FIGS. 5 through 8, the higher density side of each block provides for twelve modules 116 each having six adapters mounted thereon. The lower density side of each block in these FIGS. provides for twelve modules 116 each mounting four adapters. Other configurations are contemplated, including six, twelve or eighteen rows of modules 116. The lowest density contemplated for a fiber termination block according to this design consists of four adapters mounted to single side of a block 100, 100a or 101. It is anticipated that this alternative would only require a single divider 134 or 136 on that side, as shown on the right side of FIGS. 4 through 6. Alternatively, a higher density of six adapters on each side is anticipated for a block 100, 100a or 101. It is anticipated that this alternative would require a pair of dividers 134 and 140 on the right side, and a pair of dividers 136 and 138 on the left side. Higher levels of density, including eight or more adapters per side of a fiber termination block are also anticipated and these higher densities in conjunction with up to eighteen rows of modules 116 might make a third cable divider in accordance with the principles of this invention to be mounted on the front fanning device 125 desirable.

Also shown in FIG. 5 are two representative cable routes, shown as dashed lines. Route 2 extends from module 117 and illustrates the path a cable connected to an upper module would follow: through front fanning device 125 and into a channel defined by divider 138, into cable guide 110, between side guides 112, and through rear guide 114 into a trough attached to frame 11, which is described in more detail below. Route 4 extends from the lowest module 116, through the front fanning device 125 and into a channel defined by divider 136, into cable guide 110, between side guides 112, and through rear guide 114 into a trough attached to frame 11, which is described in more detail below.

Referring now to FIGS. 9 through 11, further details of divider 138 are shown. Note that axes designations are included in each FIG. and that these axes designations are consistent among the FIGS. As described above, divider 138 is sized and shaped to provide separate channels for the cross-connect cables from the higher mounted modules to be routed down through once these cables pass through front fanning devices 125. Divider 138 extends from a first end 140, to a second end 184, and with the exception of the mounting structures 144 and 146, is generally planar along the z-axis. This first end 140 is curved as shown to promote the smooth transition of cables from the left side of modules 116 into channel 150 which is defined on the right side of the front of block 101. First major surface 142 defines the left limit of channel 150 and second major surface 143 defines the right limit of channel 152. These two major surfaces 142 and 143 are generally planar along the z-axis. First major surface 142 may be divided into sections 242 and 244, where section 244 is lies generally parallel to the y-axis and section 242 is angled from the y-axis to cooperate with the curve of first end 140 to promote the smooth transition of cables from the left side of modules 116 into channel 150.

Mounting structures or clips 144 and 146 are sized and shaped to permit divider 138 to be mounted to the front of front fanning guides 126. Clips 144 and 146 extend along the x-axis and are essentially perpendicular with first major surface 142. Clip 146 includes a lip 160 and a curved surface 164. Curved surface 164 is arced about the z-axis and is shaped to coincide with the shape of curved surface 132 of a front fanning guide 126. Lip 160 runs parallel to the x-axis and is sized and shaped to engage upper edge 130 of front fanning guide 126. Lower clips 144 include a lip 162, parallel with lip 160, for engaging the lower edge of a front fanning guide 126. When divider 138 is mounted to a block 101, extension 148 at second end 184 extends into cable guide 110 at the bottom of the front of block 101. Tab 186 of extension 148 is sized and shaped to engage a tab 113 on radious limiter surface 111 when divider 138 is mounted on front fanning guides 126. Outer edge 190 is the edge opposite the mounting clips 144 and 146 and extends generally along the y-axis. On this edge are defined two tabs 191 and 192. These tabs 191 and 192 cooperate with cross-connect cable cover 102 to more fully enclose channel 150 when cable cover 102 is closed, while allowing easy access to the cables within channel 150 when cable cover 102 is open.

Figure 12:
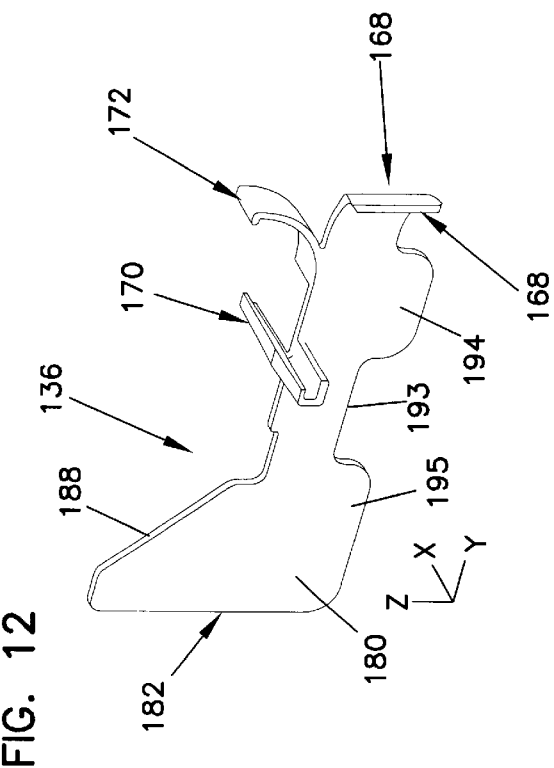
FIG. 12 is a perspective view of the short fiber management guide shown in FIG. 6.
Figure 13:
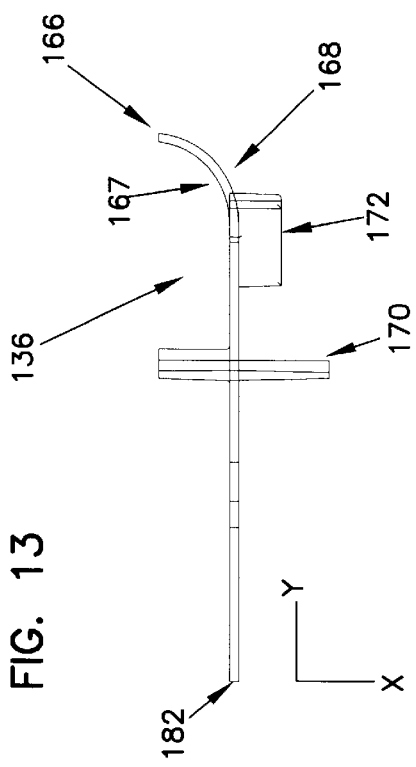
FIG. 13 is a front view of fiber management guide of FIG. 12.
Figure 14:
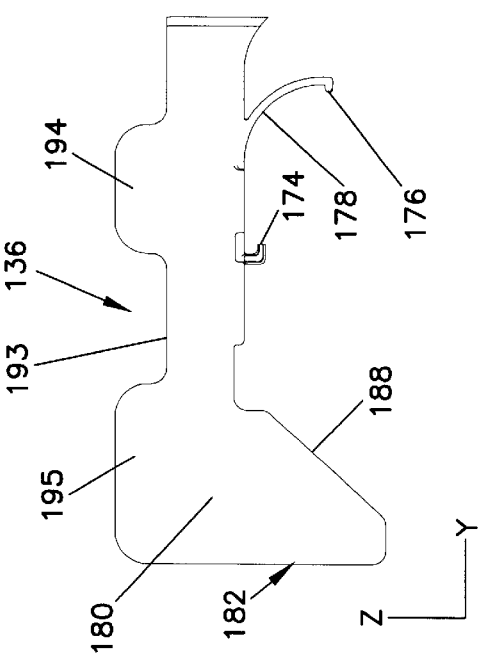
FIG. 14 is a side view of fiber management guide of FIG. 12.

Referring now to FIGS. 12 through 14, the details of divider 136 are shown. Note that axes designations are included in each FIG. and that these axes designations are consistent among the FIGS. As described above, divider 136 is sized and shaped to provide separate channels for the cross-connect cables from the lower mounted modules to be routed down through once these cables pass over the front fanning dividers. Divider 136 extends a first end 166 to a second end 182, and with the exception of the mounting structures 170 and 172, is generally planar along the z-axis. First end 166 is curved as shown to promote the smooth transition of cables from the left side of modules 116 into channel 152 which is defined on the right side of the front of block 101. First major surface 168 defines the left limit of channel 152 and second major surface 167 defines the right limit of channel 154. These two major surfaces 168 and 167 are generally planar along the z-axis.

Mounting structures or clips 170 and 172 are sized and shaped to permit divider 136 to be mounted to the front of front fanning guides 126. Clips 170 and 172 extend along the x-axis and are essentially perpendicular with first major surface 168 and second major surface 167. Clip 172 includes a lip 176 and a curved surface 178. Curved surface 178 is arced about the z-axis and is shaped to coincide with the shape of curved surface 132 of a front fanning guide 126. Lip 176 runs parallel to the x-axis and is sized and shaped to engage upper edge 130 of front fanning guide 126. Lower clip 170 includes a lip 174, parallel with lip 176, for engaging the lower edge of a front fanning guide 126. When divider 136 is mounted to a block 101, extension 180 at second end 182 extends into cable guide 110 at the bottom of the front of block 101. Tab 188 of extension 180 is sized and shaped to engage a tab 113 on radious limiter surface 111 when divider 136 is mounted on front fanning guides 126. Outer edge 193 is the edge opposite the mounting clips 170 and 172 and extends generally along the y-axis. On this edge are defined two tabs 194 and 195. These tabs 194 and 195 cooperate with cross-connect cable cover 102 to more fully enclose channel 152 when cable cover 102 is closed, while allowing easy access to the cables within channel 152 when cable cover 102 is open.

Figure 15:
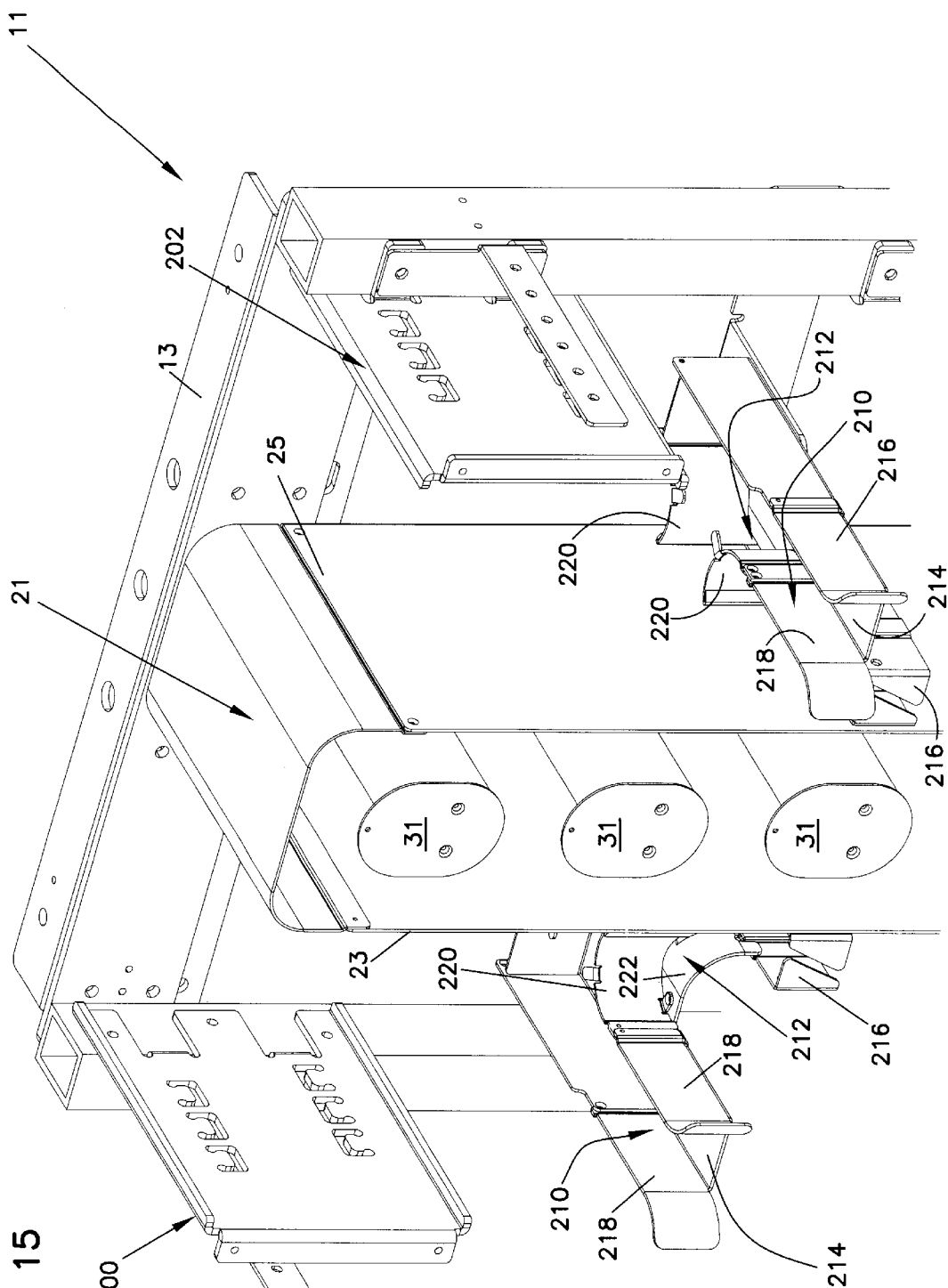
FIG. 15 is a perspective view of the upper portion of the fiber distribution frame of FIG. 4 with the fiber termination blocks removed to show the cable troughs.

Referring now to FIG. 15, the upper portion of frame 11 from FIG. 4 is shown in more detail. Fiber termination blocks 100 and 101 have been removed from this frame for clarity. Fiber termination block mounts 200 and 202 are attached to the frame on opposite sides and allow blocks 100 and 101 to be mounted to the frame. Horizontal cable troughs 210 are mounted to frame 10 so that when a block 100 or 101 is mounted to frame 10, the cross-connect cables passing through rear cable guide 114 are directed into horizontal trough 210. Horizontal trough 210 extends from front to back within frame 10 and is designed to direct cross-connect cables exiting from a block 100 or 101 into cable down trough 212, which in turn directs the cross-connect cables into vertical cable guide 216 for routing to lower trough 32 at the base of the frame. Trough floor 214 and opposed vertical trough sides 218 define horizontal trough 210. The top of horizontal trough 210 is left open for ease of cable management. Curved sidewalls 220 permit the cross-connect cables to transition from horizontal trough 210 into down trough 212 without violating bend radius rules.

Often, when a cross-connect cable is routed through the series of troughs in a frame 10, the weight of the vertical run of the cable within vertical cable guides 216 serves to draw all slack out of the cable inside fiber termination block 100 or 101. This is undesirable, since some cable slack is necessary to permit easy handling of cables within the fiber termination block 100 or 101. The interior surfaces of trough bottoms 214, trough sides 218, and down trough bottom 222 are therefore coated with a high friction coating or otherwise provided with a high friction producing surface when in contact with cable jackets. In the embodiment shown in FIG. 15, this coating is in the form of non-skid paint applied to the parts during production. Other options for providing such a high friction surface include adhesive rubber panels sized and shaped to fit within pre-existing frames to permit retrofitting of the older frames with this invention, as well as to enable new frames to be built in accordance with this invention. Other surface treatment techniques appropriate for the manufacturing process used to produce the components of the troughs are also anticipated.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is as follows:

1. A cable management device for use with a fiber optic connector assembly, the fiber optic connector assembly including:
   a fixture having a first end and a second end;
   a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, each adapter defining a longitudinal axis extending perpendicular to the line of travel of the respective module, the longitudinal axes extending parallel to one another between the front end and the back end of the fixture;
   a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture, the cable management device comprising:

a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

2. The cable management device of claim 1, wherein the number of modules and arcuate cable guides in each assembly is twelve.

3. The cable management device of claim 2, wherein the cable management divider has a curved end and two clips sized and shaped to allow the cable management divider to be removably mounted to the arcuate cable guides.

4. The cable management device of claim 3, wherein the cable management divider is mounted so that the curved end of the cable management divider is aligned with the 4th arcuate cable guide from the bottom of the assembly.

5. The cable management device of claim 3, wherein a second cable management divider is mounted on the arcuate cable guides.

6. The cable management device of claim 5, wherein the second cable management divider has a curved end and a series of clips sized and shaped to allow the second cable management divider to be removably mounted to the arcuate cable guides.

7. The cable management device of claim 6, wherein the cable management divider is mounted so that the curved end of the cable management divider is aligned with the 4th arcuate cable guide from the bottom of the assembly and the curved end of the second cable management divider is aligned with the 8th arcuate cable guide from the bottom of the assembly.

8. A fiber optic connector assembly comprising:

a fixture having a first end and a second end;

a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, each adapter defining a longitudinal axis extending perpendicular to the line of travel of the respective module, the longitudinal axes extending parallel to one another between the front end and the back end of the fixture;

a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture; and a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

9. The fiber optic connector assembly of claim 8, wherein a first and a second group of signal transmission modules are movably mounted adjacent to one another on the fixture and are configured so that the line of travel of the first group of signal transmission modules is parallel to the line of travel of the other group of signal transmission modules, and further that the first group and the second group of signal transmission modules are configured to move in opposite directions.

10. The fiber optic connector assembly of claim 9, wherein the cable fanning device includes a first group and a second group of arcuate cable guides mounted on either side of a central mounting support member, the mounting member situated perpendicular to the line of travel of the signal transmission modules, the cables extending from the first group of signal transmission modules extend across the across the first group of arcuate cable guides and the cables from the second group of signal transmission modules extend across the across the second group of arcuate cable guides, and further that a cable management divider is mounted to each group of arcuate cable guides.

11. The fiber optic connector assembly of claim 10, wherein two cable management dividers are mounted on each group of arcuate cable guides.

12. An optical fiber distribution frame comprising:

a support structure defining a vertical support;

a plurality of fiber optic connector assemblies mounted on the vertical support in a single row, each fiber optic assembly including:

a fixture having a first end and a second end;

a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, each adapter defining a longitudinal axis extending perpendicular to the line of travel of the respective module, the longitudinal axes extending parallel to one another between the front end and the back end of the fixture;

a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture; and a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

13. The optical fiber distribution frame of claim 12, wherein a first and a second group of signal transmission modules are movably mounted adjacent to one another on the fixture and are configured so that the line of travel of the first group of signal transmission modules is parallel to the line of travel of the other group of signal transmission modules, and further that the first group and the second group of signal transmission modules are configured to move in opposite directions.

14. The optical fiber distribution frame of claim 13, wherein the cable fanning device includes a first group and a second group of arcuate cable guides mounted on either side of a central mounting support member, the mounting member situated perpendicular to the line of travel of the signal transmission modules, the cables extending from the first group of signal transmission modules extend across the across the first group of arcuate cable guides and the cables from the second group of signal transmission modules extend across the across the second group of arcuate cable guides, and further that a cable management divider is mounted to each group of arcuate cable guides.

15. The fiber optic connector assembly of claim 14, wherein two cable management dividers are mounted on each group of arcuate cable guides.

16. A cable management divider for mounting on a fiber optic connection assembly, the divider comprising:
a body including a first curved end and a second end oppositely positioned from the first end, the body including a first major surface and an opposite second major surface, the major surfaces extending between the first and second ends, at least one of the major surfaces being shaped to direct cables located adjacent to the divider into a further cable management device;
a first mounting clip attached to the cable management divider proximate the first curved end, the first mounting clip sized and shaped to engage a curved surface of an arcuate cable guide; and
a second mounting clip attached to the cable management divider body, the second mounting clip sized and shaped to engage an edge of an arcuate cable guide.

17. The cable management divider of claim 16, wherein an upper tab and a lower tab extend from the body of the divider in a direction opposite the first and second mounting clips.

18. A cable management device for use with a fiber optic connector assembly, the fiber optic connector assembly including:
a fixture having a first end and a second end;
a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, a plurality of the lines of travel extending parallel to one another, each adapter defining a longitudinal axis, the longitudinal axes extending parallel to one another between the front end and the back end of the fixture;
a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture, the cable management device comprising:
a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

19. The cable management device of claim 18, wherein the number of modules and arcuate cable guides in each assembly is twelve.

20. The cable management device of claim 19, wherein the cable management divider has a curved end and two clips sized and shaped to allow the cable management divider to be removably mounted to the arcuate cable guides.

21. The cable management device of claim 20, wherein the cable management divider is mounted so that the curved end of the cable management divider is aligned with the 4th arcuate cable guide from the bottom of the assembly.

22. The cable management device of claim 20, wherein a second cable management divider is mounted on the arcuate cable guides.

23. The cable management device of claim 22, wherein the second cable management divider has a curved end and a series of clips sized and shaped to allow the second cable management divider to be removably mounted to the arcuate cable guides.

24. The cable management device of claim 23, wherein the cable management divider is mounted so that the curved end of the cable management divider is aligned with the 4th arcuate cable guide from the bottom of the assembly and the curved end of the second cable management divider is aligned with the 8th arcuate cable guide from the bottom of the assembly.

25. A fiber optic connector assembly comprising:
a fixture having a first end and a second end;
a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, a plurality of the lines of travel extending parallel to one another, each adapter defining a longitudinal axis, the longitudinal axes extending parallel to one another between the front end and the back end of the fixture;
a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture; and a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

26. The fiber optic connector assembly of claim 25, wherein a first and a second group of signal transmission modules are movably mounted adjacent to one another on the fixture and are configured so that the line of travel of the first group of signal transmission modules is parallel to the line of travel of the other group of signal transmission modules, and further that the first group and the second group of signal transmission modules are configured to move in opposite directions.

27. The fiber optic connector assembly of claim 26, wherein the cable fanning device includes a first group and a second group of arcuate cable guides mounted on either side of a central mounting support member, the mounting member situated perpendicular to the line of travel of the signal transmission modules, the cables extending from the first group of signal transmission modules extend across the across the first group of arcuate cable guides and the cables from the second group of signal transmission modules extend across the across the second group of arcuate cable guides, and further that a cable management divider is mounted to each group of arcuate cable guides.

28. The fiber optic connector assembly of claim 27, wherein two cable management dividers are mounted on each group of arcuate cable guides.

29. An optical fiber distribution frame comprising:
a support structure defining a vertical support;
a plurality of fiber optic connector assemblies mounted on the vertical support in a single row, each fiber optic assembly including:
a fixture having a first end and a second end;
a plurality of signal transmission modules mounted on the fixture with each of the modules movably mounted on the fixture for movement along a line of travel, each one of the modules including a plurality of adapters for holding a fiber optic connector, each one of the adapters movable with one of the modules along the line of travel, a plurality of the lines of travel extending parallel to one another, each adapter defining a longitudinal axis, the longitudinal axes extending parallel to one another between the front end and the back end of the fixture;
a cable fanning device including a series of spaced arcuate cable guides, each arcuate cable guide having a linear body extending transversely to the longitudinal axes and parallel to the lines of travel, the linear body having a curved outer surface, the arcuate cable guides positioned such that each of the cables connected to a first side of the modules extends from the adapters in the modules to the curved body of one of the arcuate cable guides and passes into a cable channel on the first end of the fixture; and a cable management divider mounted to the arcuate cable guides for organizing the cables extending from the modules across the cable guides and into the cable channel such that a plurality of the cable guides are divided into cable guiding sections, wherein cables extending from higher located modules are directed so as not to overlay upon and interfere with the movement of cables extending lower located modules when the fixture is mounted so that the longitudinal axes and the line of travel are horizontal.

30. The optical fiber distribution frame of claim 29, wherein a first and a second group of signal transmission modules are movably mounted adjacent to one another on the fixture and are configured so that the line of travel of the first group of signal transmission modules is parallel to the line of travel of the other group of signal transmission modules, and further that the first group and the second group of signal transmission modules are configured to move in opposite directions.

31. The optical fiber distribution frame of claim 30, wherein the cable fanning device includes a first group and a second group of arcuate cable guides mounted on either side of a central mounting support member, the mounting member situated perpendicular to the line of travel of the signal transmission modules, the cables extending from the first group of signal transmission modules extend across the across the first group of arcuate cable guides and the cables from the second group of signal transmission modules extend across the across the second group of arcuate cable guides, and further that a cable management divider is mounted to each group of arcuate cable guides.

32. The fiber optic connector assembly of claim 31, wherein two cable management dividers are mounted on each group of arcuate cable guides.

33. A cable trough system for an optical fiber distribution frame, the optical fiber distribution frame comprising:
a support structure defining a vertical support;
a plurality of fiber optic connector assemblies each having a rear end adjacent the support structure and extending generally perpendicular from the support structure to a front end, the assemblies having sides between the rear and front ends with fiber optic connection locations positioned within the sides and the front and rear ends;
the assemblies secured to the support structure with a first plurality of assemblies mounted in a generally vertical array on a first side of said support structure and a second plurality of assemblies mounted in a generally vertical array on a second side of the support structure;
a plurality of cable management troughs mounted to the support structure adjacent to a lower end of each of the assemblies, the cable management troughs having an open front end and a rear end and extending beneath of the assemblies, the troughs having an open top and configured to have an interior surface defined by a bottom wall and opposed vertical side walls;
the front ends of the troughs adjacent to the assemblies to permit cables from the assemblies to pass into the troughs, an opening in a side wall of the trough to permit cables from the trough to pass out of the trough and extend down a vertical cableway defined within the support structure, with each of the side openings having a curved lower surface extending from the bottom of the trough downward to prevent the cables extending downward from violating bend radius requirements, and each of the side and front openings having curved side walls to prevent cables extending through the openings from violating bend radius requirements; and the interior surface of the troughs having a surface resistant to sliding movement of the cables within each of the troughs.

34. The cable trough system of claim 33, wherein the curved lower surfaces of the side openings have a surface resistant to sliding movement of the cables extending through the openings.

35. The cable trough system of claim 33, wherein the interior surface of each of the troughs includes a non-skid coating.

36. The cable trough system of claim 35, wherein the non-skid coating is paint.

37. The cable trough system of claim 33, wherein the interior surface of each of the troughs is made of a high friction material.

* * * * *

UNITED STATES PATENT AND TRADEMARK OFFICE
CERTIFICATE OF CORRECTION

PATENT NO. : 6,532,332 B2
DATED : March 11, 2003
INVENTOR(S) : Solheid et al.

It is certified that error appears in the above-identified patent and that said Letters Patent is hereby corrected as shown below:

<u>Title page,</u>
Item [*] Notice, should read
-- [*]   Notice:  Subject to any disclaimer, the term of this patent is extended or adjusted under 35 U.S.C. 154(b) by 102 days --

Signed and Sealed this

Twenty-eighth Day of October, 2003

JAMES E. ROGAN
*Director of the United States Patent and Trademark Office*